United States Patent

[11] 3,557,979

| [72] | Inventor | Warren Gene Zortman |
| | | R.R.2, Box 31, Onawa, Iowa 51040 |
| [21] | Appl. No. | 777,336 |
| [22] | Filed | Nov. 20, 1968 |
| [45] | Patented | Jan. 26, 1971 |

[54] GRAIN DRYING BIN
4 Claims, 5 Drawing Figs.

[52] U.S. Cl............................................. 214/17,
34/167, 34/232; 222/316, 222/317
[51] Int. Cl........................................B65g 65/46,
B65g 69/20
[50] Field of Search............................. 214/17.8,
83.2; 34/167, 232; 222/564, 316, 317

[56] References Cited
UNITED STATES PATENTS
3,356,270  12/1967  Heider.......................... 214/83.2X
3,365,812  1/1968   Borrow......................... 214/17(.8)X

*Primary Examiner*—Robert G. Sheridan
*Attorney*—Shlesinger, Arkwright & Garvey

ABSTRACT: A grain drying bin including: a housing, a sectored floor for said housing, an opening in said floor for removing grain from said housing, said sectored floor having alternating peaks and valleys, and conveyor means associated with each of said valleys for removing grain from said valleys and depositing said grain in said floor opening; the walls of said valleys define an angle of 18—28 degrees with the horizontal; cover means associated with each of said conveyor means spaced above said conveyor means and spaced from the walls of said valleys for permitting dry grain to reach said conveyor means and for preventing moist grain from reaching said conveyor means; and including means associated with said floor opening for conveying dry grain to a discharge area.

INVENTOR
WARREN GENE ZORTMAN

BY
Shlesinger, Arkwright & Harvey
ATTORNEYS

INVENTOR
WARREN GENE ZORTMAN 3,557,979

GRAIN DRYING BIN

BACKGROUND

The present invention relates to a bin for drying grain, and includes a greatly improved mechanism for removing the dried grain from the bin.

Prior art drying bins have been limited by the large amount of wear which occurs on the various parts, and also by the fact that a large amount of moist grain was removed with the dried grain. Many of these prior art devices have used an auger on the floor of the bin for rotating about the center of the bin and simultaneously conveying grain to a central discharge opening in the floor. However, this type of apparatus results in a large amount of stress and resulting wear on the auger because of the great amount of force required to rotate the auger about the center of the bin against the weight of the grain.

Attempts have been made to overcome these forces on the auger by means of a plurality of stationary augers radiating from the center of the floor. This type of apparatus is described in the U.S. Pat. to Borrow, 3,365,812. The augers of this patent also have an angle member surmounting them to keep the weight of the grain off of the augers. However, the angle member is spaced from neither the auger nor the walls of the valleys, nor is there any provision for adjusting the angle member.

Prior art grain drying bins have been further limited in their lack of adaptability to grains of different particle size and grains of different moisture content. These differing characteristics of grain require equipment which is adaptable to these different conditions.

OBJECTS

It is, therefore, a primary object of this invention to provide a low-cost, efficient, grain-drying bin which overcomes the deficiencies of the prior art.

Another object of this invention is to provide a grain-drying bin which prevents moist grain from being removed from the bin.

Still another object of this invention is to provide a grain-drying bin having a plurality of augers for removing dry grain from the bin.

Still a further object of this invention is to provide a grain-drying bin having a plurality of augers for removing dry grain, wherein drive power is initially supplied to a single auger, and is subsequently transmitted to the remaining augers.

A further object of this invention is to provide a grain-drying bin including means for preventing moist grain from reaching said augers, and permitting dry grain to reach said augers and be removed from the bin.

A further object of this invention is to provide a grain-drying bin including a cover for each of a plurality of augers for preventing moist grain from reaching said augers, and permitting dry grain to reach said augers and be removed from the bin.

Another object of this invention is to provide means for adjusting vertically and laterally the positions of said covers.

A further object of this invention is to provide a grain-drying bin having a sectored floor, the sectors being defined by alternating peaks and valleys, and augers being positioned in said valleys.

These and other objects and advantages of this invention will be apparent from the following description and claims.

DESCRIPTION OF THE INVENTION

Figure 1:
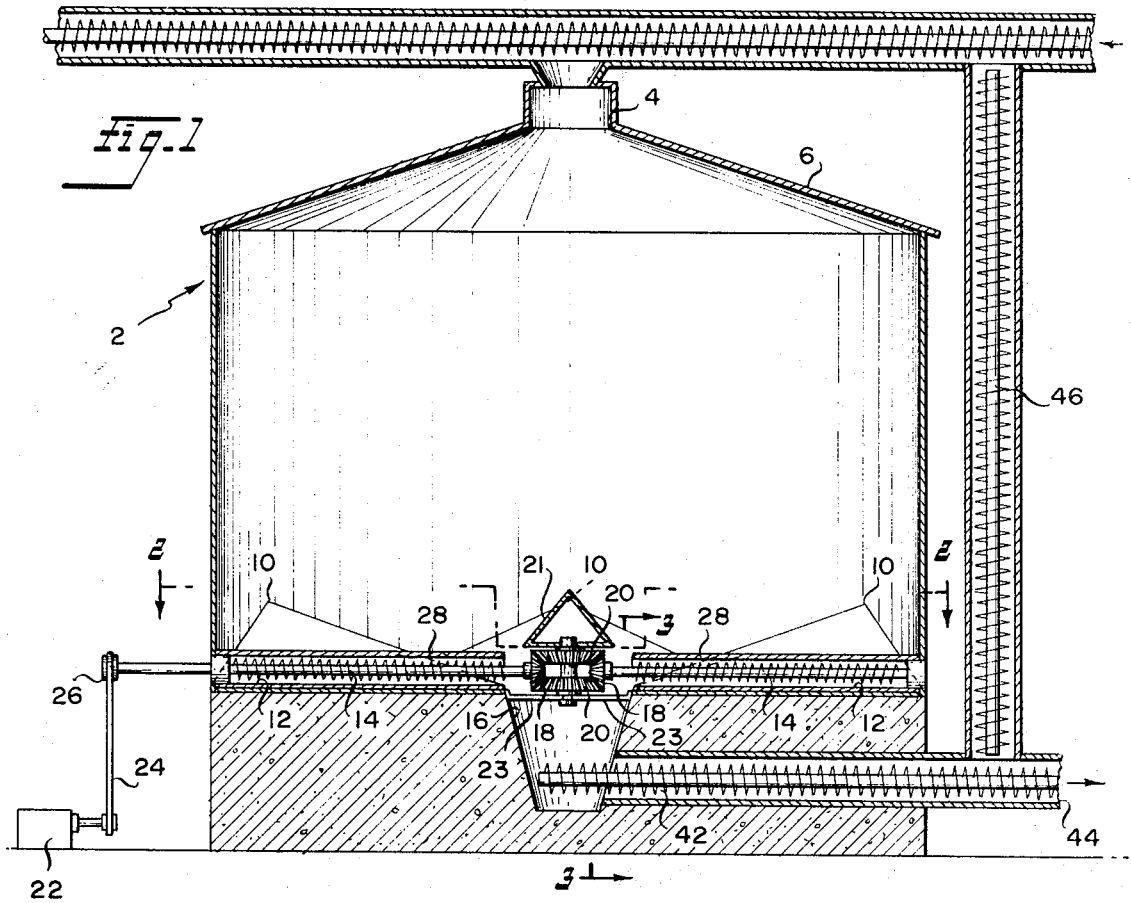
FIG. 1 is a cross-sectional view of the grain-drying bin of this invention.

In FIG. 1, 2 designates generally the housing having an opening 4 in the roof 6 for admitting grain to the housing 2. Grain is conveyed to the opening 4 by means of auger 8.

Figure 2:
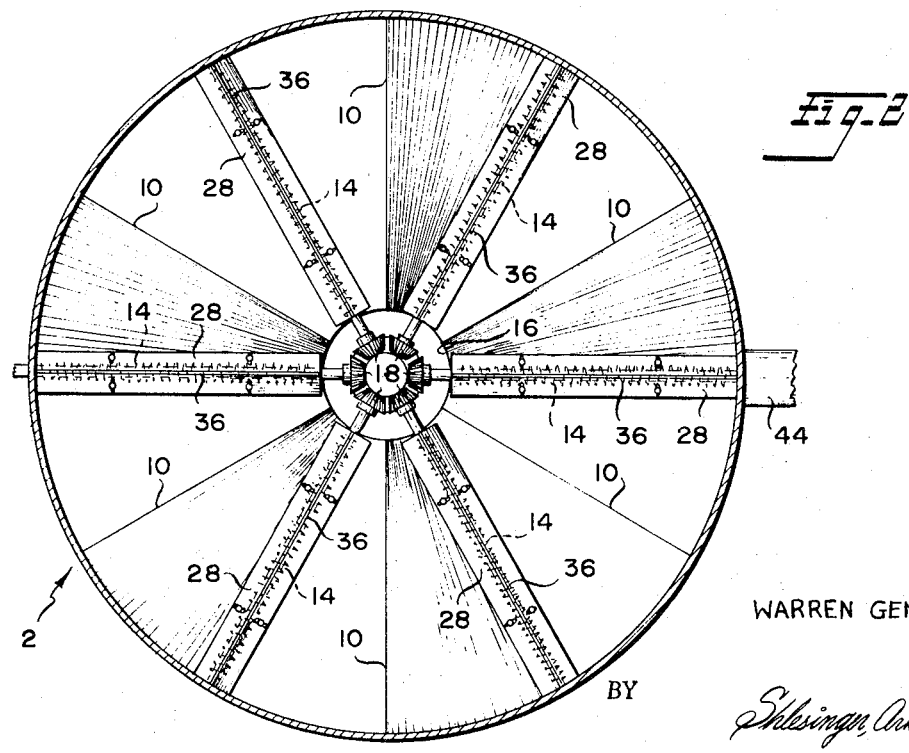
FIG. 2 is a cross-sectional view along lines 2—2 in FIG. 1 and viewed in the direction of the arrows.

In FIG. 2, the floor of the housing 2 has alternating peaks 10 and valleys 12. The peaks 10 slope downwardly toward the center of the housing as is best seen in FIG. 1, while the valleys are substantially horizontal. Positioned within each of the valleys 12, is an auger 14 for conveying dry grain to a floor opening 16. At the inner end of each of the augers 14, is a pinion gear 18 which is in mesh with bevel gear 20. Outside of the housing 2 is provided drive motor 22 which is connected by belt 24 and pulley 26, to one of the augers 14 for driving said auger. The driven auger thus transmits power through pinion gears 18 and bevel gears 20 to the remainder of augers 14. Additionally, there is provided a conical cover 21 for the gearbox to keep grain from clogging the gears. The gearbox is mounted within floor opening 16 by means of brackets 23.

Figure 3:
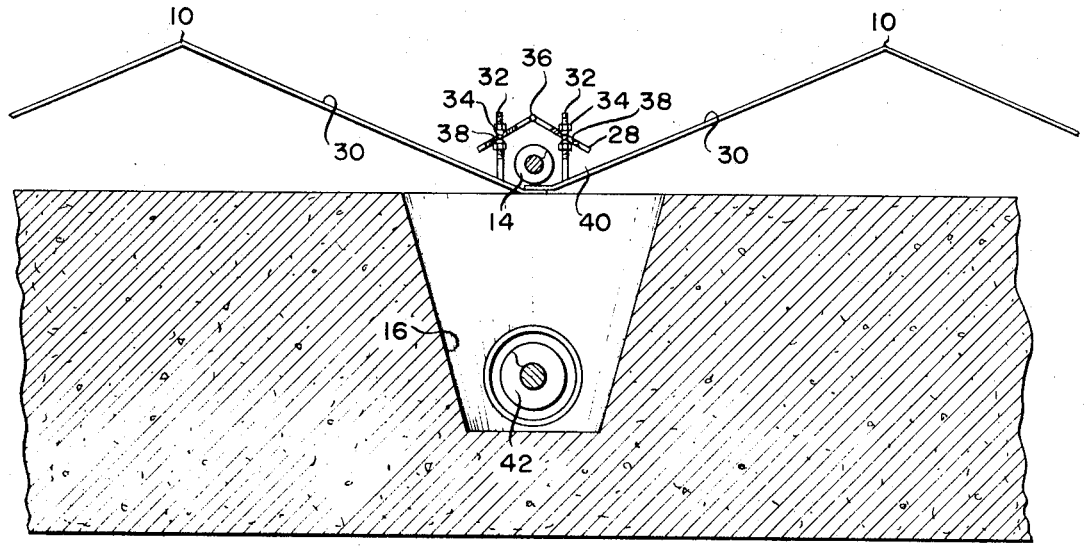
FIG. 3 is a cross-sectional fragmentary view taken along the lines 3—3 in FIG. 1 and viewed in the direction of the arrows.
Figure 4:
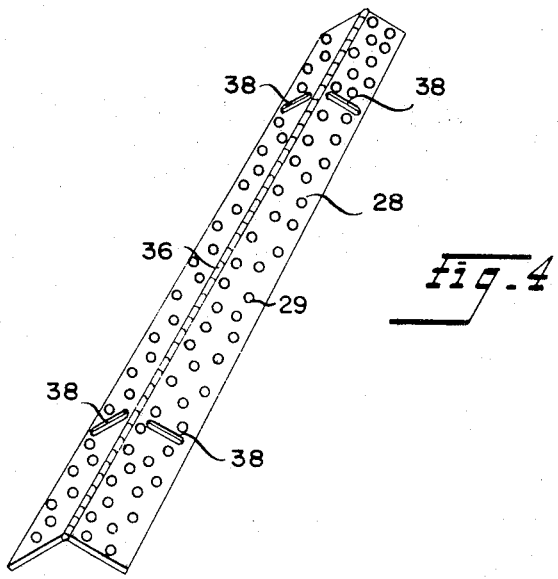
FIG. 4 is a fragmentary perspective view of the auger covers.

As is best seen in FIG. 3, each of the augers 14 has a cover 28 associated therewith. Cover 28 may include perforations 29 seen in FIG. 4 to permit passage of air. Cover 28 is spaced for auger 14 and the walls 30 of valleys 12 by means of posts 32 and spherical nuts 34 threaded on posts 32. Cover 28 has a hinge 36 which secures the two halves of the cover, and each half includes elongate slots 38 through which pass the threaded posts 32. Thus, both the horizontal position and the lateral position of the cover 28 may be adjusted by changing the position of nuts 34 on posts 32. This adjustment changes the dimensions of space 40 between cover 28 and the walls of the valley 30, to permit more or less grain to reach the auger. By increasing the space, moist grain will not clog the space as readily as if a smaller space were present. The size of space 40 has been found to be critical to efficient operation, and preferably lies within the range of about 1 to about 3 inches.

Figure 5:
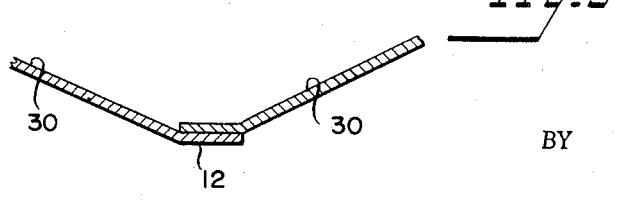
FIG. 5 is an enlarged, fragmentary, sectional view of the floor expansion joint of this invention.

FIG. 5 illustrates the overlapping joint of the walls 30 of valleys 12. There is no mechanical connection between the two walls, and in this manner, the expansion or contraction of the walls 30 will not result in a gap being formed in valleys 12.

Extending from floor opening 16 there is provided an auger 42 for removing dry grain from the housing. This grain may be removed for use through discharge outlet 44, or may be recycled by means of auger 46 is further drying is required.

OPERATION OF THE INVENTION

In operation, grain is fed into housing 2 where it is allowed to stand. The grain would fall onto the floor of the housing, and also on to covers 28 of augers 14. Because of the caking tendency of moist grain, the grain would tend to clog the space 40 between covers 28 and the wall 30 of valleys 12. Thus, the moist grain would not be able to reach conveyors 14, and it could not be discharged from the housing. However, as the grain became dry through the evaporation of moisture therefrom the caking of the grain would be reduced, and the grain would fall through space to augers 14. The augers 14 then convey the dry grain to the floor opening 16, and the dry grain is removed from the housing by auger 42. It has been found that in order for space 40 not to clog with dry grain, and also to prevent packing of moist grain in space 40, the angle of the walls 30 of valleys 12 must preferably be at an angle of about 18 to about 28° with the horizontal. Further, space 40 preferably lies within the range of about 1 to about 3 inches and the space between the lower ends of cover 28 is about 5 to about 10 inches. When the above mentioned angle and spaces are maintained within the approximate ranges stated, dry grain can flow freely to the auger, while moist grain clogs space 40 just sufficiently to hold it there until it has dried. Additionally, the adjustability of cover 28 also provides means whereby the space 40 may be adjusted for different grains or for different degrees of moisture content of the grain.

While this invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

I claim:
1. A grain drying bin including:
   a. a housing;
   b. a sectored floor in said housing;
   c. an opening in said floor for removing grain from said housing;
   d. said sectored floor having alternating peaks and valleys;
   e. the walls of each of said valleys defining an angle of from 18° to 28° with the horizontal;
   f. conveyor means associated with each of said valleys for removing grain from said valleys and depositing said grain in said floor opening;
   g. cover means for said conveyor means spaced above said conveyor means and spaced from the walls of said valleys for permitting dry grain to reach said conveyor means and for preventing moist grain from reaching said conveyor means, said cover means including inverted, hinged, substantially V-shaped troughs;
   h. means associated with said floor opening for conveying dry grain to a discharge point;
   i. at least two upstanding posts for supporting each half of each of said troughs; and
   j. means associated with said posts for adjustably positioning said troughs.
2. A grain-drying bin as in claim 1, and including:
   a. means associated with said cover means for permitting dry grain to reach said conveyor means and for preventing moist grain from reaching said conveyor means.
3. A grain-drying bin as in claim 2, and wherein said means associated with said cover means includes perforations formed in said cover means.
4. A grain-drying bin as in claim 1, and wherein:
   a. the space between the lower extremities of said trough is about 5 to about 10 inches.